US007451727B2

(12) United States Patent
Sergeev

(10) Patent No.: US 7,451,727 B2
(45) Date of Patent: Nov. 18, 2008

(54) INTERNAL COMBUSTION ENGINE AND METHOD FOR THE OPERATION THEREOF

(76) Inventor: Alexandr Nikolaevich Sergeev, L. Chaykinoy street, #35, apt. 70, Toliyaltti 445046 (RU)

( * ) Notice: Subject to any disclaimer, the term of this patent is extended or adjusted under 35 U.S.C. 154(b) by 23 days.

(21) Appl. No.: 11/424,110

(22) Filed: Jun. 14, 2006

(65) Prior Publication Data

US 2006/0266325 A1     Nov. 30, 2006

Related U.S. Application Data

(63) Continuation of application No. PCT/RU05/00029, filed on May 31, 2006.

(30) Foreign Application Priority Data

| Mar. 30, 2004 | (RU) | ............................. 2004109772 |
| Sep. 24, 2004 | (RU) | ............................. 2004128405 |

(51) Int. Cl.
  *F02B 33/22* (2006.01)
  *F02B 33/04* (2006.01)
  *F02B 19/10* (2006.01)
  *F02B 19/08* (2006.01)
  *F02B 19/04* (2006.01)

(52) U.S. Cl. .................. 123/70 R; 123/73 C; 123/289; 123/274

(58) Field of Classification Search ............... 123/70 R, 123/259, 274, 275, 277, 265, 266, 289, 72; F02B 33/22, F02B 19/10, 19/00
See application file for complete search history.

(56) References Cited

U.S. PATENT DOCUMENTS 2,058,705 A  *  10/1936  Maniscalco .................. 123/72

| 3,809,027 A |   | 5/1974 | Morgan ........................ 123/275 |
| 3,934,562 A | * | 1/1976 | Isaka ........................... 123/274 |
| 5,007,384 A | * | 4/1991 | Blair ........................... 123/70 R |

(Continued)

FOREIGN PATENT DOCUMENTS

AU       9950078 A  *  5/2000

(Continued)

OTHER PUBLICATIONS

International Search Report from International Application No. PCT/RU2005/000029, mailed on May 5, 2005.

*Primary Examiner*—Thai-Ba Trieu
(74) *Attorney, Agent, or Firm*—Houston Eliseeva LLP

(57) ABSTRACT

An engine comprises a working cylinder provided with a piston, a preignition chamber provided with a spark plug and a combustion chamber which are connected to a compressor cylinder by channels. The compressor cylinder is provided with fuel and air supplying channels arranged in the top section thereof and with a piston and a shutoff valve. Return valves are mounted at the output of the valve supplying air to the compressor cylinder. The corresponding method for operating the engine consists in adjusting the velocity of a fuel-air mixture injection into the preignition chamber and the combustion chamber by modifying pressure in the compressor cylinder. When the fuel-supply impulse is increased, the pressure is also increased and vice-versa, when the impulse is reduced, the pressure is also lowered, thereby ensuring an air/fuel ratio in the preignition chamber equal to 8:1-20:1.

14 Claims, 4 Drawing Sheets

U.S. PATENT DOCUMENTS

| | | | |
|---|---|---|---|
| 5,076,229 A * | 12/1991 | Stanley | 123/289 |
| 5,526,778 A * | 6/1996 | Springer | 123/70 R |
| 5,785,015 A * | 7/1998 | Philippe et al. | 123/70 R |
| 6,019,075 A * | 2/2000 | Galka et al. | 123/70 R |
| 6,026,769 A * | 2/2000 | Anbarasu et al. | 123/70 R |
| 6,189,495 B1 * | 2/2001 | Tuckey et al. | 123/73 C |
| 6,571,755 B1 * | 6/2003 | Dunn et al. | 123/70 R |

FOREIGN PATENT DOCUMENTS

| | | | |
|---|---|---|---|
| DE | 2441087 A * | 3/1976 | |
| DE | 2922683 A * | 12/1980 | |
| FR | 2174562 | 10/1973 | |
| GB | 1135482 | 4/1996 | |
| JP | 05098975 A * | 4/1993 | |
| RU | 2039877 C1 * | 7/1995 | |
| RU | 2179250 C1 * | 2/2002 | |
| RU | 2229029 | 11/2002 | |
| RU | 2229609 C1 * | 5/2004 | |
| RU | 2230202 | 6/2004 | |
| SU | 1822465 | 6/1993 | |

* cited by examiner

INTERNAL COMBUSTION ENGINE AND METHOD FOR THE OPERATION THEREOF

RELATED APPLICATIONS

This application is a Continuation of PCT application serial number PCT/RU2005/000029 filed on 31 Jan. 2005 which in turn claims priority to Russian application number RU2004109772 filed 30 Mar. 2004 and Russian application number RU2004128405 filed 24 Sep. 2004, all of which are incorporated herein by reference in their entirety.

FIELD OF THE INVENTION

The invention relates to motor engineering and can be implemented when manufacturing and operating internal combustion engines with an injection system of fuel-air mixture into the engine working cylinder.

BACKGROUND OF THE INVENTION

The internal combustion engine is known (RU Patent No. 2229029, of 25, Nov., 2002, Int. Cl. P02B33/22). This engine comprises a working cylinder provided with a piston, kinematically connected with an engine shaft, and a compressor cylinder made in a single block with the working cylinder. A sleeve with the inlet windows, connected with an inlet channel, is arranged in the compressor cylinder. The compressor cylinder is connected with the working cylinder by a connecting port through a shutoff valve, placed over the sleeve coaxially with the compressor cylinder and executed in the form of a cup with a spring and a seat, which is formed by the upper end surface of the sleeve. A compressor piston is installed (mounted) inside the sleeve, kinematically connected with the working piston. The cutoff valve faces its bottom to the compressor piston. Kinematical connection of working and compressor pistons is performed with the help of the mechanisms, on whose rods working and compressor pistons are fixed. The compressor piston is installed relative to the working piston with a possibility of phase advance by 40 . . . 80° of the engine shaft rotation (turn). The sleeve cavity volume inside the compressor cylinder occupies 5 . . . 30% of the cubic capacity of the working cylinder. Inside the compressor cylinder, in its middle part, a circular neck is made, connected with the inlet channel. The windows in the sleeve are arranged along its circle against the neck in the compressor cylinder. A device for liquid or gas fuel delivery is installed on the inlet channel which is connected with it. Crank-slider or no-crank mechanisms are used as mechanisms, with the help of which kinematic connection of the working piston with the engine shaft and compressor piston is performed. A sparking plug is installed coaxially with the working cylinder. The connecting channel is placed in the upper part of the compressor cylinder. A projection of the connecting channel axis on the longitudinal section plane of the working and the compressor cylinders is arranged at the angle of 20 . . . 60° relative to the longitudinal axis of the working cylinder. A vertex of this angle is directed towards a working cylinder head. The connection channel axis projection on the cylinders cross-section plane is placed at the angle of 15 . . . 40° to the working cylinder cross-section axis, intersecting with the longitudinal axis of the compressor cylinder.

A diaphragm is installed under the working piston in the working cylinder, provided with a seal in the central part, through which the mechanism rod is passed through, with the help of which kinematic connection of the working pistol with the engine valve piston is performed. The external contour of the diaphragm surface is executed corresponding to the internal surface contour of the working piston, and the outlet channel is placed above the diaphragm. The above piston space is connected with the under piston space by scavenge ports (blow-off channels). The device for liquid or gas fuel delivery is executed in the form of a nozzle.

The engine design allows to increase power and stability of its operation. However, when this engine operates the fuel-air mixture, passing from the compressor cylinder through the connecting channels to the combustion chamber, is cooled, which may lead to the appearance (origination) of a drop phase in the fuel-air mixture composition. This will break mixture homogenity and will lead to leaning of the vapor phase that will reduce power, make engine operating stability worse and increase fuel consumption.

The control of this engine operation is traditionally reduced to the adjustment of the fuel amount in the fuel-air mixture composition coming from the working cylinder, which allows to change the number of the engine crankshaft rotations and its power depending on the load. Such method of the engine operation control does not allow to use lean (poor) fuel-air mixture and does not provide stable engine operation at slow crank-shaft rotations, which leads to the increase of consumption and to incomplete combustion of the fuel.

The internal combustion engine, protected by the RF Patent No. 2230202 of 8 Jan. 2003, Int. Cl. 7 P02B19/10 is known as well, which is taken as a prototype. The engine comprises a cylinder with a piston, a fuel-air mixture compressor gun and a cylinder head, where spherical or conical combustion chamber is placed and a cylindrical preignition chamber. The combustion chamber and the preignition chamber are connected with the mixture compressor gun by one or several channels. Projections of the axes channels parts, included in the combustion chamber and the preignition chamber, on the longitudinal section plane of the working cylinder are placed at the angles of 90 . . . 20 and 90 . . . 140° correspondingly relative to the working cylinder axis. The channels inputs are arranged tangentially to the chamber surfaces. The combustion chamber channels are directed towards the preignition chamber channels. This allows to increase engine power and to decrease toxicity of exhaust gases at the expense of poor fuel-air mixture application.

Such collection of features of the proposed engine design allows to increase the engine power and to decrease toxicity of the exhaust gases at the expense of poor fuel-air mixture application.

However, when the engine operates according to the prototype the fuel-air mixture, passing along the channels from the compressor gun to the preignition chamber and combustion chamber, may be cooled as well, which will lead to the formation of the liquid drop phase in the fuel-air mixture composition, leaning the mixture in fuel above the permissible limit.

Besides, a part of the fuel-air mixture, sliding along the combustion chamber walls under the influence of the vertical component of the centrifugal forces, may untimely (prematurely) be thrown out to the above (over)-piston space, leaning the remained in the combustion chamber mixture. As a result the engine operating stability will be broken, its power will be reduced and fuel consumption will increase.

The engine operation method according to the prototype consists as well in the fact that the amount of fuel in the fed to the combustion chamber fuel-air mixture is changed. The compression ratio of this mixture is strictly specified by the cutoff valve parameters and can not be changed in engine operation depending on its operation mode. It limits the possibilities of poor mixture application and does not provide further improvement of fuel combustion degree, which reduces possibilities for engine power increase and reduction of exhaust gases toxicity.

The technical result of the invention: improvement of operating stability of the engine and its power, reduction of fuel consumption and reduction of exhaust gases toxicity.

SUMMARY OF THE INVENTION

The essence of the invention consists in the fact that, the offered internal combustion engine comprises a working cylinder with a piston, kinematically connected with a crankshaft. The working cylinder has a head, where a combustion chamber and a preignition chamber provided with a sparking plug are placed. The combustion chamber and the preignition chamber are connected through the return valves by the fuel-air mixture delivery channels with a fuel-air mixture compressor gun. The compressor gun is executed in the form of a compressor cylinder with a piston and is provided with a fuel delivery device and channels for fuel and air delivery, as well as with a cutoff valve with a seat. The compressor cylinder piston is kinematically connected with the working piston.

The engine power is controlled by changing the fuel amount in the fuel-air mixture, injected in the preignition chamber and the combustion chamber, for which purpose pulse duration of fuel delivery through the device for its measuring is changed.

Unlike the prototype the fuel delivery channel and the device for fuel delivery installed in it, as well as air delivery channels, are arranged in the upper part of the compressor cylinder above the upper dead point of the compressor piston. Return valves are installed in the compressor cylinder at the outlet of the air delivery channel. The channels for the fuel-air mixture delivery (supply) to the preignition chamber and the combustion chamber are executed in the form of a tube, divided along its axis by a partition or in the form of two tubes, installed parallel to each other, and are placed in the lid cavity, filled with a cooling liquid, which closes working and compressor cylinders. The channels for the fuel-air mixture delivery to the preignition chamber and the combustion chamber are provided with a heater and its power supply unit. A cooling liquid temperature-sensitive element, which is connected with the heater power supply unit, is placed in the zone of these channels.

The combustion chamber has a cylindrical shape. The axes projections of the channels parts, entering the preignition chamber and the combustion chamber, on the plane of the longitudinal section of the working cylinder are perpendicular to the working cylinder axis. The channel for the fuel-air mixture delivery to the preignition chamber is provided with an adjusting mechanism with a drive, which is connected with a fuel delivery device or with an engine rotation speed transducer.

Besides, the engine is provided with an operation mode transducer, a drive for pressure (pressure drive) on the cutoff valve and a processor. The operating mode transducer is connected with the processor, and the processor is connected with a device for fuel proportioning and with the pressure drive on the cutoff valve.

When the engine operation mode is changed, the injection velocity of the fuel-air mixture into the preignition chamber and the combustion chamber is adjusted, increasing or decreasing pressure in the compressor cylinder. For that the cutoff valve pressure on the seat is changed. When pulse duration of the fuel delivery increases, pressure in the compressor cylinder is increased, and when the pulse duration of the fuel delivery decreases, pressure in the compressor cylinder is decreased so, that in the preignition chamber in the arrangement zone of the sparking plug electrode, the air and fuel ratio of 8:1 . . . 20:1 should be provided in the fuel-air mixture.

The fuel-air mixture injection into the preignition chamber and the combustion chamber of the working cylinder is performed when the working piston goes to the upper dead point after blocking of inlet and outlet channels of the working cylinder, but not later than 50 before a spark discharge on the sparking plug electrodes.

Such collection of features of the engine and method to control it unlike the prototype provides the possibility to deliver fuel into the compressor cylinder within the limits of 0 to 360° of the compressor piston move, that enlarges the possibility to adjust the engine power. The fuel-air mixture prepared in the compressor cylinder and heated under compression, passing through the channel to the combustion chamber and preignition chamber of the working cylinder, is not cooled. It excludes the formation of the liquid phase in the fuel-air mixture composition that improves engine operating stability. The proposed shape of the combustion chamber and the arrangement of channels, entering the combustion chamber and the preignition chamber prevent the possibility of premature the fuel-air mixture stall into the above-piston space of the working cylinder that also improves engine operating stability and reduces fuel consumption.

The existence of the adjustment mechanism in the channel for the fuel-air mixture delivery to the preignition chamber and its connection with the rotation speed transducer or with the fuel delivery device allows to change the amount of mixture, delivered to the preignition chamber depending on the amount of fuel in the fuel-air mixture. It will allow, while increasing the engine power, to reduce the amount of rich fuel-air mixture in the preignition chamber and prevent the possibility of fuel excess in the sparking plug electrodes zone. As a result the operating stability of the engine will be improved at its high power.

The collection of features of the proposed engine and method of control thereof provides changing of the fuel-air mixture compression degree under changes of the engine operation mode. It allows to keep constant the ratio of fuel and air in the fuel-air mixture composition in the sparking plug electrodes zone within the given limits. As a result, when the amount of fuel in the fuel-air mixture composition increases its full combustion will be provided, that will increase the engine power, decrease fuel consumption and decrease exhaust gases toxicity. When the amount of fuel in the fuel-air mixture decreases engine operating stability will increase at the expense of (due to) provision of the rich mixture kernel in the sparking plug electrodes zone. It will also increase engine power, provide fuel saving and reduce exhaust gases toxicity.

BRIEF DESCRIPTION OF THE DRAWINGS

The invention is illustrated by the diagrams.

DETAILED DESCRIPTION OF THE PREFERRED EMBODIMENTS

Figure 1:
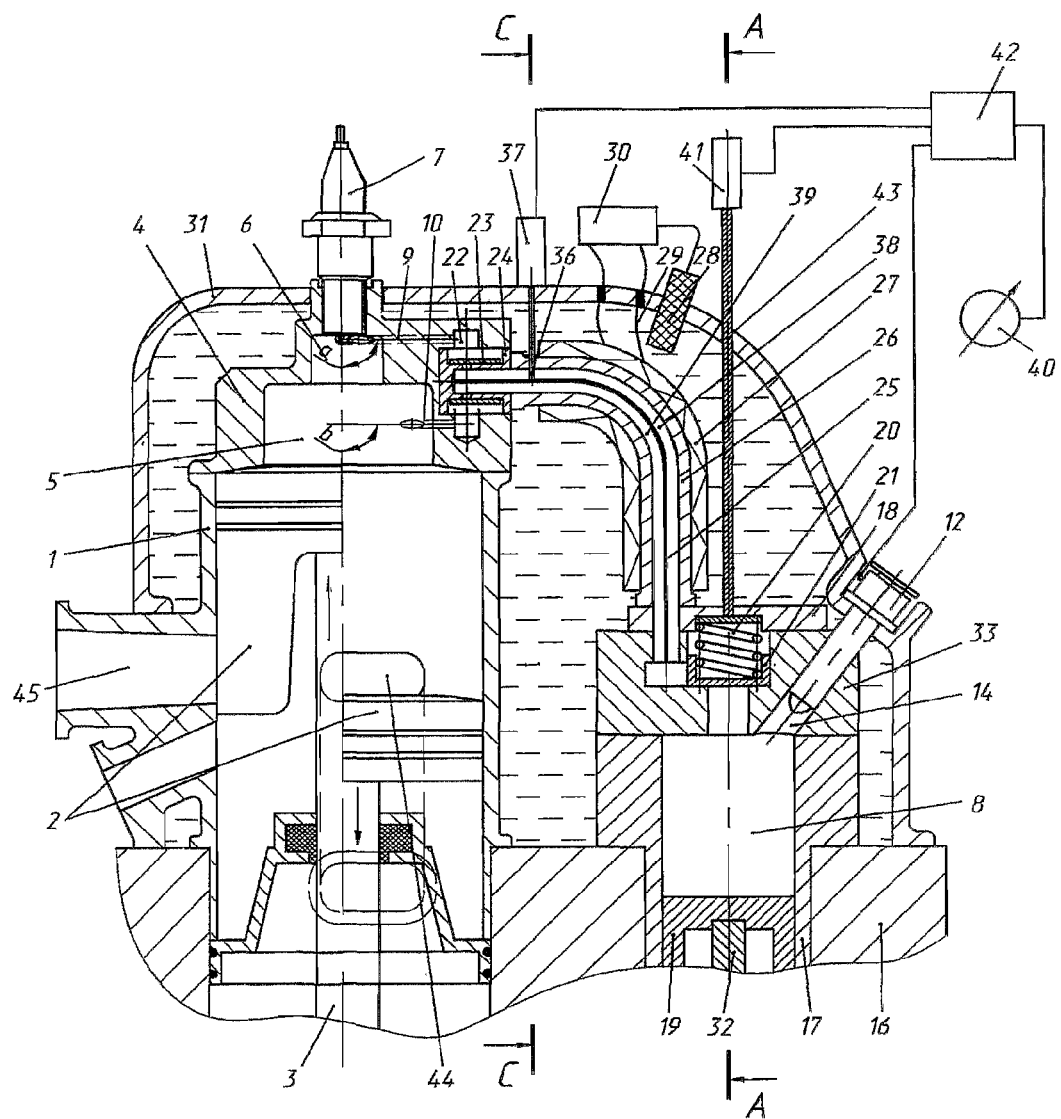
in
FIG. 1 the construction diagram of the proposed engine is shown, in
FIG. 2—the section along A-A in FIG. 1, in
FIG. 3—the section along B-B in FIG. 2, and in
FIG. 4—the section along C-C in FIG. 1.

The proposed engine contains a working cylinder 1 with a working piston 2, which through a rod 3 is kinematically connected with a crankshaft. In a head 4 of the working cylinder 1 a combustion chamber 5 is placed, having cylindrical shape, and a preignition chamber 6, provided with a sparking plug 7. The combustion chamber 5 and the preignition chamber 6 are connected with a compressor gun of the fuel-air mixture by the channels 9, 10, 22, as well as by channels 39 and 38, located in a tube 26, which is divided by a partition 25, through the return valves 23, mounted in a case (body) 24. The channels 39 and 38 can be executed in the form of separate tubes as well, installed parallel to each other. Such execution of the channels 39 and 38 may be appropriate (expedient) when producing a low power engine, when it is difficult to execute the partition 25 in the tube of small diameter.

Figure 2:
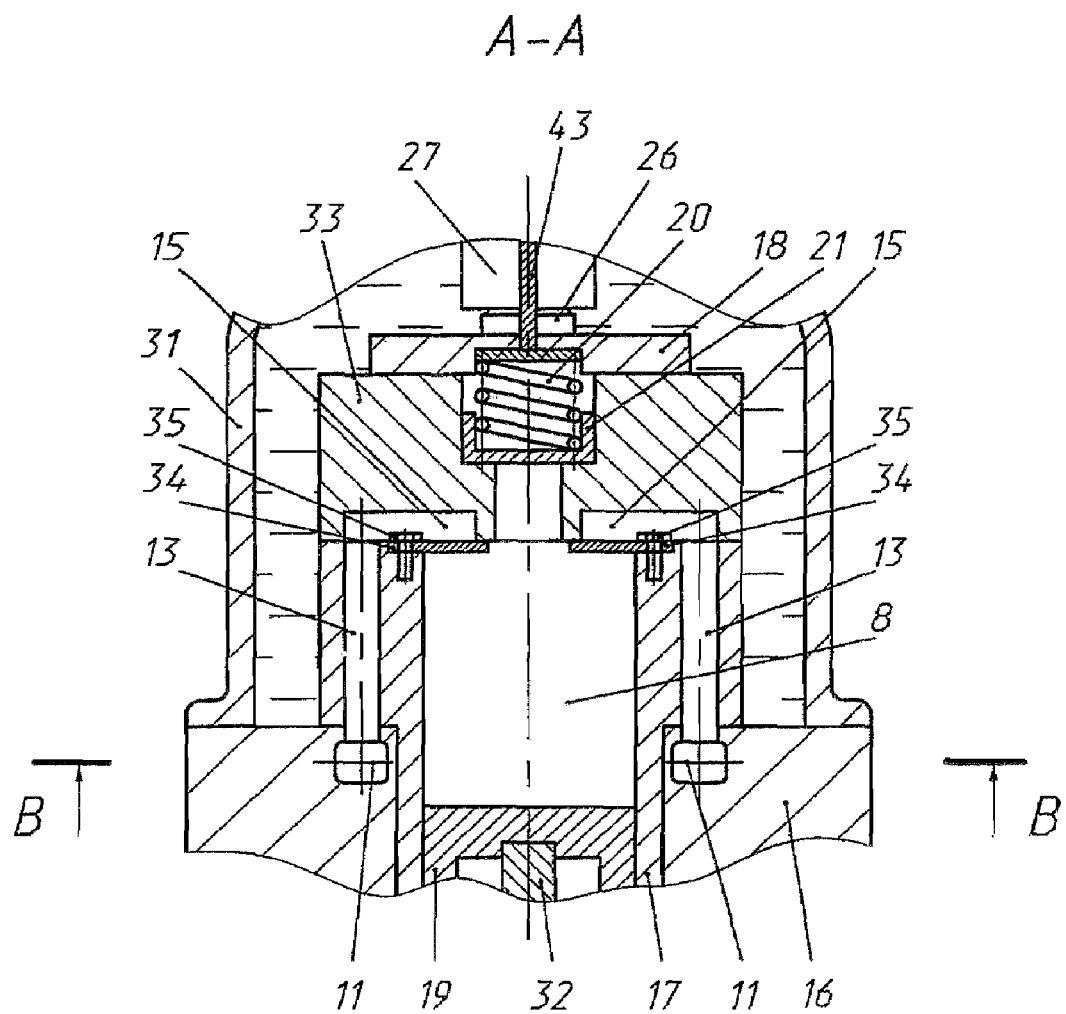
Figure 3:
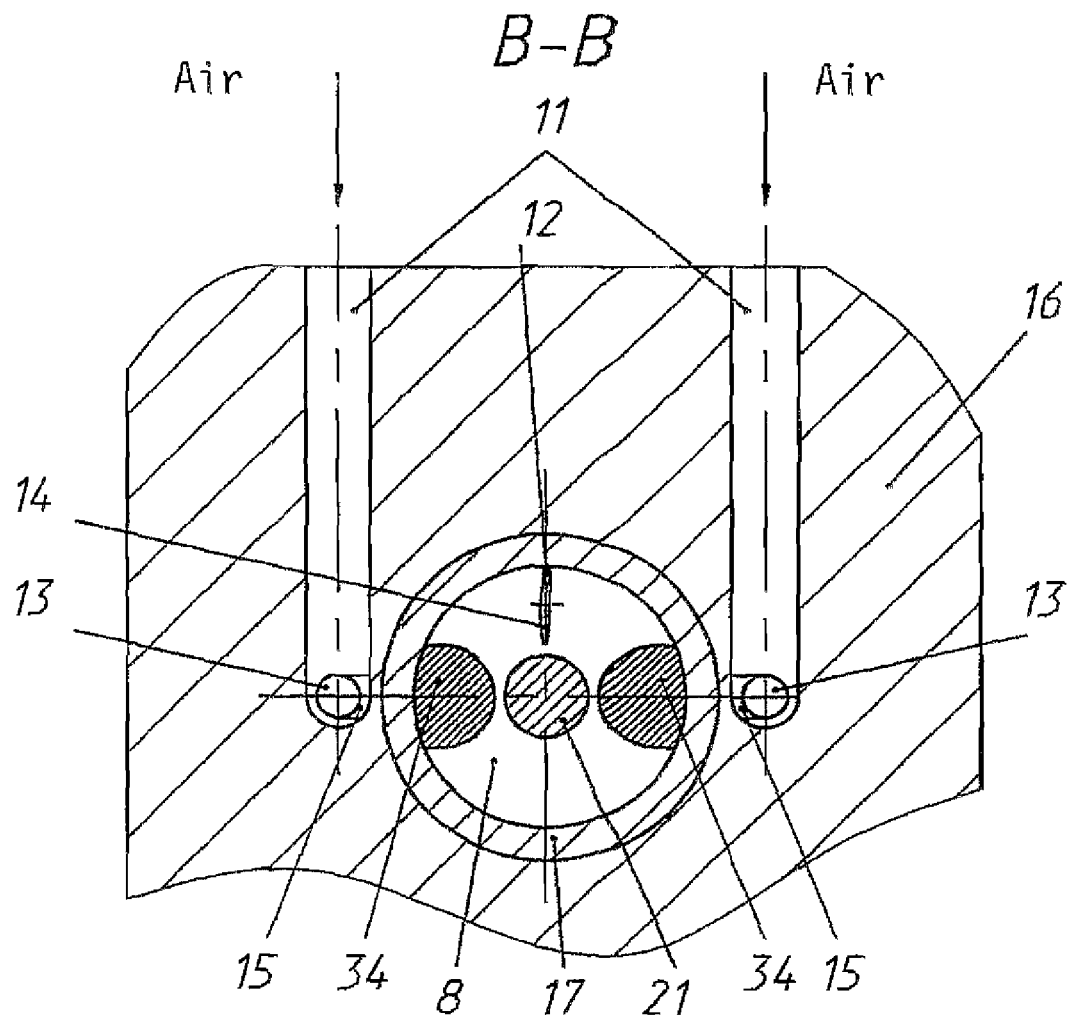
Figure 4:
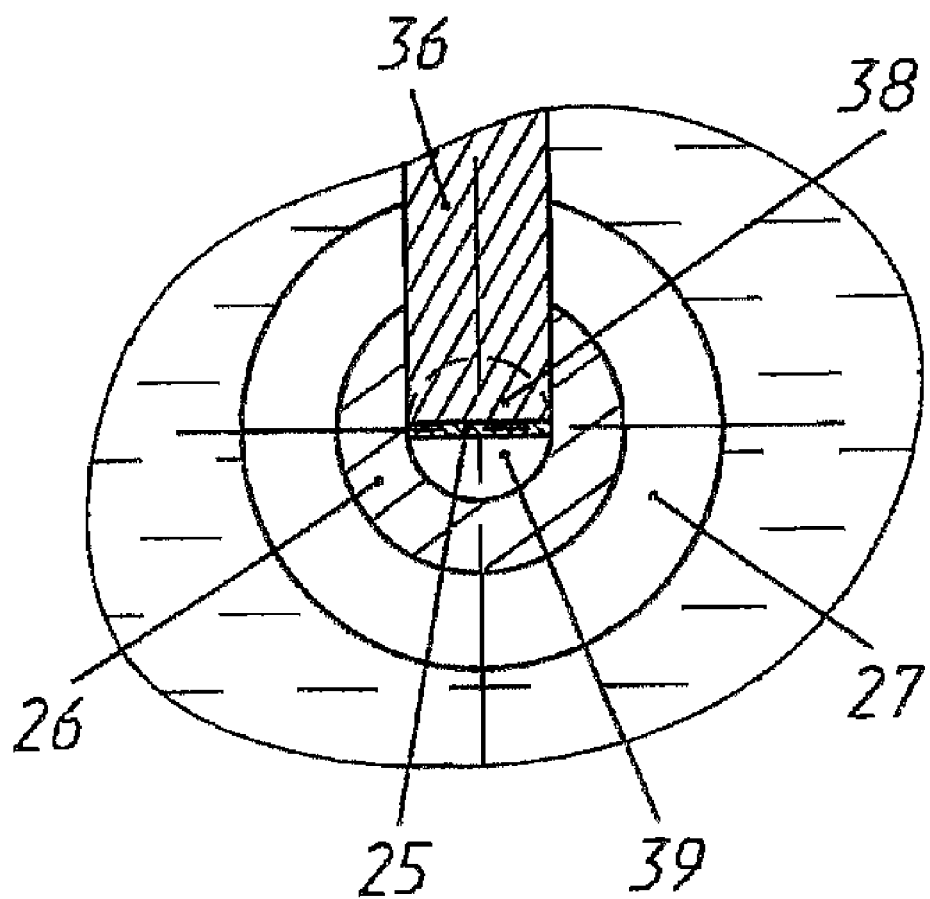

The compressor gun of the fuel-air mixture is executed in the form of a compressor cylinder 17 with a piston 19 and a rod 32, kinematically connected with the rod 3 of the working piston 2. In a lid 33 of the compressor cylinder 17 a cutoff valve 21 is installed with a spring 20, pressed to the lid 33 by a plate 18. A seat for the back valve 21 serves a bottom plane in the lid 33, where the valve 21 is placed. Besides, in the lid 33 a channel 14 is executed for fuel delivery and one or several channels 15 for air delivery, which are connected with the atmosphere through the channels 13 and 11, executed correspondingly in the case 16 of the compressor cylinder 17 and in the case 16 of the engine (FIG. 2). At the outlet of the channel 14 the device 12 for fuel delivery is installed, a nozzle, for example, can be used as such a device.

The arrangement of the channels 14 and 15 in the lid 33 predetermines entering of these channels into a cavity 8 of the compressor cylinder 17 above the dead point of the compressor piston 19. At the outlets of the channels 15 into the cavity 8 of the compressor cylinder 17 the return valves 34 are mounted, which can be, for example, leaf ones and fixed to the end surface of the compressor cylinder 17 by the crews 35.

The tube 26, containing channels 39 and 38 for fuel-air mixture delivery to the combustion chamber 5 and the preignition chamber 6 is located in the cavity, filled by the cooling liquid under the lid 31, closing the working 1 and compressor 17 cylinders and fixed on the case 16 of the engine. The tube 26 is provided with a heater 27 (for example, electric one), which is connected with its power supply unit 30 by the wires 29. In the location zone of the tube 26 with the channels 39 and 38 a cooling liquid temperature-sensitive element 28 is installed, which is connected with the power supply unit 30 of the heater 27.

The projections of the axes parts of the channels 9 and 10, entering correspondingly the preignition chamber 6 and the combustion chamber 5, on the longitudinal section plane of the working cylinder 1, are placed perpendicular to the axis of the working cylinder 1 (angles a=b=90°).

The channel 38 for the fuel-air mixture delivery to the preignition chamber 6 is provided with an adjustment mechanism 36. A drive 37 of the mechanism 36 is connected with a speed rotation transducer of the engine crankshaft or with a device 12 for fuel delivery.

The engine is provided with an operating mode transducer 40, a drive 41 for pressure on the cutoff valve 21 and a processor 42. The operating mode transducer 40 is connected with the processor 42, which is connected with the device 12 for fuel delivery and with the drive 41 for pressure on the cutoff valve 21.

The arrangement of the channel 14 with the device 12 for duel delivery and channels 15 for air delivery in the lid 33 predetermines entering of these channels into the cavity 8 of the compressor cylinder 17 in the upper part of this cavity above the upper dead point (UDP) of the compressor piston 19. This, unlike the prototype, increases time, during which fuel delivery is possible into the cavity 8 of the compressor cylinder 17. Fuel delivery can be performed in any motion phase of the piston 19 of the compressor cylinder 17 from 0 to 360°. It excludes the possibility of premature fuel cutoff in case of the opened device 12 (for example, a nozzle) because of the channel 14 blocking by the pistol 19 when it moves towards UDP, as it may occur in the engine according to the prototype, that limited the possibility to increase engine power. In the proposed engine the arrangement of the channel 14 above UDP of the compressor piston 19 allows to perform fuel injection into the cavity 8 of the compressor cylinder 17 in any position of the piston 19. As a result the possibility to enlarge engine power increases.

The arrangement of the air delivery channels 15 in the lid 33 of the compressor cylinder 17 increases filling with air the cavity 8 of the compressor cylinder 17, because in this case air delivery is provided during all the time of the compressor piston movement from UDP to the lower dead point (LDP). When the piston 19 goes back from LDP to UDP the outlets of channels 15 are blocked by the valves 34, compression of the fuel-air mixture occurs. When the piston 19 goes from UDP to LDP underpressure is formed above the piston 19, the valves 34 open and through the channels 15, 13 and 11 clear air from the atmosphere is sucked in the cavity 8 during the time, corresponding to 180° of the pistol 19 move. Simultaneously with the beginning of air delivery to the cavity 8 of the compressor cylinder 17, fuel injection starts through the channel 14 with the help of the device 12. It provides more complete mixing of fuel with air, which starts before the beginning of fuel-air mixture compression. As a result the quality improvement of fuel-air mixture is provided, which becomes more homogeneous. Engine operating stability is improved, unproductive (wasteful) fuel consumption is reduced and engine power is increased due to more complete subsequent fuel-air mixture combustion in the working cylinder 1 of the proposed engine.

When the compressor piston 19 goes from UDP to LDP fuel-air mixture is compressed, as a result of it, it is heated up to 300 ... 4000. Fuel evaporates, that provides single phase gas composition of the whole fuel-air mixture. However, in the engine according to the prototype on leaving the compressor cylinder 17 the compressed fuel-air mixture, entering trough channels 39 and 38 the combustion chamber 5 and preignition chamber 6, is cooled and its temperature decreases. Besides, the fuel-air mixture injection into the combustion chamber and into the preignition chamber 6 should be performed at the pressure in the working cylinder 1 equal to or less than the pressure in the compressor cylinder 17. In the last case in channels 38, 39, 22, 9, 10, in the combustion chamber 5 and the preignition chamber 6 expansion of the fuel-air mixture will occur, which will also lead to the reduction of its temperature. As a result a part of the fuel in the fuel-air mixture composition will condense, having been released in the form of a liquid drop phase. It will disrupt abruptly engine operating stability, reduce its power and increase fuel consumption—misfires (ignition omissions) of the fuel-air mixture will become possible. This disadvantage in the proposed engine design is eliminated by the fact that the channels 39 and 38 are executed in the form of the tube 26, separated by a partition 25. The tube 26 is provided with the heater 27 and is located in the cavity filled with the cooling liquid under a lid 31, closing the working 1 and compressor 17 cylinders. The fuel-air mixture passing through the channels 39 and 38 is heated with the help of the heater 27 up to the temperature, slightly exceeding the fuel evaporation temperature. It prevents fuel condensation in the combustion chamber 5 and in the preignition chamber 6. The cooling liquid surrounding the tube 26 is heated from the heater 27 simultaneously with the fuel-air mixture. That is why the sensitive element 28, measuring the cooling liquid temperature, is installed in the location zone of the tube 26 with the channels 39 and 38. The sensitive element 28 gives a command to the power supply 30 of the heater 27, which in accordance with this command adjusts power, fed to the heater 27. In the beginning of the engine operation, when the cooling liquid has not yet been heated up from the released by the engine heat, power given up by the power supply 30 of the heater 27 is a maximum, then, with heating of the cooling liquid, power decreases. As a result the fuel-air mixture, whose temperature is slightly higher than the fuel evaporation temperature enters the combustion chamber 5 and the preignition chamber 6 during the whole period of the engine operation. This excludes the possibility of fuel condensation in the fuel-air mixture composition, which will also improve engine operating stability, increase its power and decrease fuel consumption. In this case toxicity of the exhaust gases decreases, there will be no particles of fuel in their composition that were not burned.

Giving the combustion chamber 5 a cylindrical shape allows to hold more completely (efficiently), within the limits of its volume, the swirling flow of the fuel-air mixture coming from the tangentially located channel 10. In case of spherical or conical shape of the combustion chamber 6, provided by the prototype, a vertical component of the centrifugal force, acting on the tangentially swirling flow of the fuel-air mixture, occurs. The vertical component tends to throw out a part of the fuel-air mixture flow from the combustion chamber 5 to the working cylinder 1. This leads to over-leaning of fuel-air mixture, which causes its misfires (ignition omissions). Engine operating stability decreases, its power decreases, fuel consumption decrease. The accepted in the proposed engine cylindrical shape of the combustion chamber 5 eliminates this disadvantage, because in this case there is practically no vertical component of the centrifugal force.

The arrangement of the axes projections of the channels 9 and 10 parts, entering correspondingly the preignition chamber 6 and the combustion chamber 5, on the longitudinal section plane of the working cylinder 1 perpendicular to the axis of the working cylinder 1 also contributes to the possibility reduction of the fuel-air mixture stall from the preignition chamber 6 and the combustion chamber 5 to the working cylinder 1. At any other value of the angles a and b, that differs from 90°, distortions will occur in the shape of the swirling fuel-air mixture flows, which will lead to the increase of the vertical components of the centrifugal forces, which will increase the probability of the fuel-air mixture stall and, hence, decrease engine operating stability and its power, increase unproductive (wasteful) fuel consumption. The arrangement of the channels 9 and 10, wherein a=b=90°, eliminates this disadvantage.

The availability of an adjustment mechanism 36 with a drive 37 allows to change the throat value of the channel 38 for fuel-air mixture delivery to the preignition chamber 6. The connection of the drive 37 of the mechanism 36 with the rotation speed transducer of the engine crankshaft or with the device 12 for fuel delivery allows to decrease or increase the throat of the channel 38, depending on pulse duration of fuel delivery by the device 12 or on the rotation speed of the engine crankshaft. It will allow to adjust the amount of fuel-air mixture fed through the channel 38 in the preignition chamber 6. When it is necessary to increase engine power, pulse duration of the fuel delivery by the device 12 is increased. The fuel-air mixture becomes richer. The delivery of the rich mixture to the preignition chamber 6 can cause fuel excess (surplus) in the electrodes zone of the sparking plug 7. This will lead to the disruption of engine operating stability: extremely rich mixture in the swirl core may not ignite, liquid fuel can deposit on the electrodes of the sparking plug 7.

The throat decrease of the channel 38 with the help of the mechanism 36 will decrease the amount of fuel-air mixture in the preignition chamber 6, which will lean it out in the volume of the preignition chamber. It will exclude the possibility of misfires of fuel-air mixture and will improve engine operating stability.

When the operation mode changes, a transducer 40 feeds the signal to a processor 42, which forms and gives command to a pressure drive 41 and the device 12 for fuel. If the transducer 40 feeds to the processor 42 the signal about the increase of the fuel amount, then the processor 42 will form and give a command to the device 12 for fuel deliver about the increase of the fuel delivery pulse duration. Simultaneously the processor 42 will form and give a command to the drive 41 about the pressure increase on the cutoff valve 21, proportional to the increase of the fuel delivery pulse duration. The drive 41, performing this command, can, for example, increase preliminary spring 20 compression through a rod 43, as it is shown in the diagram, or increase air pressure in the cavity over the cutoff valve 21, having connected this cavity with the compressor or the receiver. When it is necessary to decrease engine power the transducer 40 will feed to the processor 42 the signal about the decrease of the fuel amount, delivered to the compressor cylinder 8. The processor 42 in this case will form and give to the device 12 the command about the decrease of fuel delivery pulse duration and simultaneously will form and give to the drive 41 a command about the decrease of pressure on the cutoff valve 21, for example, about the decrease of spring 20 compression degree. The drive 41 in this case will raise the rod 43, reducing preliminary compression of the spring 20, or will open the valve, releasing air from the cavity over the cutoff valve 12 in case of pneumatic embodiment of the drive 41. It will decrease pressure on the cutoff valve 21.

According to the program, which can be embedded in the processor 42, when the operation mode of the engine changes, pressure on the cutoff valve 21 is established (such) as to open it at the pressure in the cavity of the compressor cylinder 8, providing the injection velocity of the fuel-air mixture, allowing to obtain the ratio of air and fuel 8:1 . . . 20:1 in the electrodes zone of the sparking plug 7.

The proposed engine operates as follows. After the beginning of the compressor piston 19 movement from UDP through the device 12 and the channel 14, fuel is delivered to the cavity 8 of the compressor cylinder 17. When the piston 19 moves downward underpressure is formed above it, valves 34 under the influence of pressure difference will open and clear air from the atmosphere will come into the cavity 8 through the channels 11, 13 and 15. The fuel-air mixture is formed inside the cavity 8, which in the result of the piston 19 movement to the LDP is strongly mixed. When the LDP is reached the compressor piston 19 will start moving upwards towards the UDP, because through the rods 32 and 3 it is kinematically connected with the working piston 2. Compression of the fuel-air mixture will start. When the pressure in the cavity 8 of the compressor cylinder 17 reaches the value, for which the spring 20 is calibrated, the cutoff valve 21 will go up and open the inlet to the channels 38 and 39. The fuel-air mixture, passing through the channels 38 and 39, located inside the tube 26, is heated by the heater 27. The heating temperature is controlled by the sensitive element 28, which measures the temperature of the engine cooling liquid in the area of the tube 26 location, and gives a command to the power supply 30, which adjusts power, consumed by the heater 27. It provides a possibility to maintain the fuel-air mixture temperature slightly higher, than the fuel vaporization temperature, compensating by additional heating cooling of the fuel-air mixture.

The fuel-air mixture through the channels 38 and 39, leaf return valves 23, channels 22, 9 and 10 is injected to the preignition chamber 6 and the combustion chamber 5 of the working cylinder 1. The channels 9 and 10 are arranged tangentially to the internal cylindrical surface of the preignition chamber 6 and the combustion chamber 5 correspondingly. As a consequence, a jet (flush) of the fuel-air mixture in the preignition chamber 6 swirls and fuel vapors are concentrated in the middle of the upper part of the preignition chamber 6, in the area of the sparking plug 7 electrodes. Separation (into layers) of the mixture occurs, the mixture in this area becomes rich. The fuel-air mixture, coming from the channel 10 to the combustion chamber 5, swirling, forms a curtain, which prevents dispersal of the fuel-air mixture injected to the combustion chamber 6.

Since the channels 9 and 10 are arranged in such a way that projections of their axes on the longitudinal section plane of the working cylinder 1 are perpendicular to its axis, and the combustion chamber is executed as a cylindrical one, the stall possibility of the fuel-air mixture to the working cylinder 1 is minimal.

After the voltage is fed to the sparking plug 7 electrode, rich in fuel kernel (core) of the fuel-air mixture in the preignition chamber 6 will ignite and light up the relatively poor (lean) mixture in the combustion chamber 5. A (working) travel of the piston 2 will start. The fuel-air mixture in this case will combust practically completely. It will allow to stabilize engine operation, increase its power as well as reduce fuel consumption, and reduce exhaust gases toxicity.

When it is necessary to increase engine power, the pulse duration of the fuel delivery by the device 12 is increased. The fuel-air mixture in the cavity 8 of the compressor cylinder 17 will be enriched. A signal about the increase of pulse duration will arrive to the drive 37 of the adjustment mechanism 36, which will decrease the throat of the channel 38. It will decrease the amount of rich fuel-air mixture, coming to the preignition chamber 6 that will increase engine operating stability, having excluded the possibility of the mixture misfires in the preignition chamber 6. In case of fuel delivery pulse increase and enrichment of the fuel-air mixture, the speed rotation of the engine crankshaft will increase proportionally. Therefore with the same result for realization of the feedback between the fuel delivery pulse duration and the amount of fuel-air mixture, coming to the preignition chamber 6, a signal from the rotation speed transducer of the engine crankshaft can be used.

The method for operating the proposed engine is realized as follows.

Power of the proposed engine is adjusted by changing the amount of fuel in the fuel-air mixture, injected to the preignition chamber 6 and the combustion chamber 5. For that pulse duration of fuel delivery through the device 12 for fuel proportioning is changed. When the operation mode of the engine changes the velocity of fuel-air mixture injection to the preignition chamber 6 and the combustion chamber 5 of the working cylinder 1 is adjusted. For this purpose the pressure in the cavity 8 of the compressor cylinder 17 is adjusted, changing the pressure of the cutoff valve 21 on the seat. When fuel delivery pulse duration increases the pressure in the cavity 8 of the compressor cylinder 17 is increased, and when fuel delivery pulse duration decreases the pressure in the cavity 8 of the compressor cylinder 17 is decreased. The pressure change in the cavity 8 of the compressor cylinder 17 is performed in such a way as to provide the ratio of air and fuel in the fuel-air mixture 8:1 . . . 20:1 in the preignition chamber 6, in the zone of the spark plug 7 electrodes.

The injection of the fuel-air mixture to the preignition chamber 6 and the combustion chamber 5 of the working cylinder 1 is performed while the working piston 2 travels to the upper dead point after blocking the inlet channels 44 and outlet channels 45 of the working cylinder 1, but not later than 5° before the spark discharge on the electrodes of the spark plug 7.

When the compressor piston 19, kinematically connected with the working piston 2, moves upwards, the fuel-air mixture formed in the cavity 8 of the compressor cylinder 17 will be compressed. When the pressure of the fuel-air mixture reaches the value exceeding the pressure on the cutoff valve 21, which is established with the help of the drive 41, the cutoff valve 21 will go up from the seat and the fuel-air mixture will come through the connecting channels 38, 39, 9 and 10 correspondingly to the preignition chamber 6, in the zone of spark plug 7 electrodes, and to the combustion chamber 5.

The drive 41 for pressure on the cutoff valve 21 can be of any known design. It can be, for example, a pneumatic one, compressing air from a compressor or from a receiver to the cavity over the cutoff valve 8, or a mechanical one, consisting of the electromechanical drive 41 with the rod 43, acting on the spring 20, as is shown in the drawing (FIG. 1).

According to the proposed method the engine operates when a choker is completely opened or without it at all. This stipulates for equal volume of air in the working cylinder 1 at all engine operation modes. In this case for operating stability of the engine at all operation modes it is necessary to provide the fuel-air mixture with the ratio of air and fuel 8:1 . . . 20:1 in the electrodes zone of the spark plug 7 and in the combustion chamber 5. This range is chosen out of the condition of maximum permissible deviations from the stoichiometric ratio of air and fuel in the fuel-air mixture composition, which is 14,7:1. When the ratio of air and fuel in the fuel-air mixture is bigger than 20:1 the mixture core (kernel) in the electrodes zone of the spark plug 7 will be leaned out, its ignition will be made difficult, which will decrease operating stability of the engine. When the ration of air and fuel is less than 8:1 the mixture in the electrodes zone of the spark plug 7 will be extremely enriched which will lead to unproductive fuel consumption. Besides, deposition of fuel on the spark plug 7 electrodes will become possible, that can decrease the operating stability of the engine.

Small amount of fuel is required when the engine operates in the idle mode and under small loads. That is why the fuel delivery pulse duration through the device 12 is decreased. But at that the fuel-air mixture, injected from the cavity 8 of the compressor cylinder 17 should be mixed only with a part of air, situated in the working cylinder 1. For this purpose the injection pressure of the fuel-air mixture from the cavity 8 of the compressor cylinder 17 is reduced, reducing the pressure on the cutoff valve 21. In this case the cutoff valve 21 goes up when the pressure in the cavity 8 of the compressor cylinder 17 only slightly exceeds the pressure of air in the working cylinder 1. The fuel-air mixture will come through the channels 38, 39 9, and 10 to the preignition chamber 6 and the combustion chamber 5 with a slow velocity, swirling and mixing only with a small part of the air, contained in the working cylinder 1. It will provide formation of the fuel-air mixture charge with the ratio of air and fuel 8:1 . . . 20:1 in the preignition chamber 4 and the combustion chamber 5.

When the engine load is increased, the fuel delivery pulse duration is increased. It increases the amount of fuel in the fuel-air mixture composition. In order to obtain the fuel-air mixture with the chosen ratio of air and fuel in the preignition chamber 6, the pressure of fuel-air mixture in the cavity 8 of the compressor cylinder 17 is increased, increasing the pressure on the cutoff valve 21. As a result the cutoff valve 21 will open at higher pressure in the cavity 8 of the compressor cylinder 17. It will increase the injection velocity of fuel-air mixture through the channels 38, 39, 9 and 10 to the preignition chamber 6 and combustion chamber 5. As a result the penetration depth of the fuel-air mixture into the space of the working cylinder 1 will increase, the rich mixture, coming from the cavity 8 of the compressor cylinder 17, will be leaned, the layer of fuel-air mixture with the ratio of air and fuel 8:1 . . . 20:1 will be formed in the preignition chamber 4 and the combustion chamber 5, which will provide operating stability of the engine.

The injection of the fuel-air mixture to the preignition chamber 6 and the combustion chamber 5 is performed when the working piston 2 goes up to the upper dead point after blocking the inlet 44 and outlet 45 channels of the working cylinder 1, but not later than 5° before the spark discharge on the electrodes of the spark plug 7. This provides a possibility to obtain the fuel-air mixture with the stable ratio of air and fuel within the limits of 8:1 . . . 20:1 in the electrodes zone of the spark plug 7. The injection of fuel-air mixture before blocking by the working piston 2 inlet 44 and outlet 45 windows of the working cylinder 1 will lead to the engine power loss and to the increased fuel consumption, because a part of the fuel-air mixture can be thrown through the outlet windows 45. It will increase toxicity of exhaust gases as well. The air coming through the opened inlet windows 44 will lean the fuel-air mixture, which may decrease the operating stability of the engine. When the fuel-air mixture is injected later than 5° before the spark discharge on the electrodes of the spark plug 7, the fuel-air mixture will not have time to disperse in the volume of the preignition chamber 6 and the combustion chamber 5 of the working cylinder 1. The core of the over enriched mixture is formed in the electrodes zone of the spark plug 7, which will make its ignition difficult and can cause fuel deposition on the electrodes of the spark plug 7. It will make the operating stability of the engine worse.

All parts (components) of the proposed engine can be easily produced (manufactured) from the known and applied in motor engineering materials with the help of the known foundry and metal-cutting equipment. The tube 26, containing the channels 38 and 39, divided by the partition 25, can be produced of steel, aluminum or copper, for example, by rolling, welding or soldering. Any known heater can be used as the heater 27, for example, to wind an isolated coil of nichrome on the tube 26, as the power supple 30 a current source with a rheostat can be used, with an electric drive, changing voltage depending on the signal of the sensitive element 28, fed to the coil of the heater 27. For example, a thermocouple or calibrated for the given temperature bimetal plate with a contact can serve as the sensitive element 28.

The adjusting mechanism 36 can be executed, for example, in the form of a screw, as it is shown in FIG. 1, or a rod. Entering the channel 38 through an opening with a seal, executed in a wall of the tube 26, a screw (or a rod) will change the throat of this channel, which will depend on the raising height of this screw or rod by the drive 37. The drive 37 of the adjustment mechanism 36 can be, for example, an electromechanical one, turning the screw or electromagnetic one, raising the rod of the mechanism 36. Such mechanisms and drives are widely known in engineering.

For example, a potentiometer or any known variable reluctance pickup can be used as the transducer 40, which is mechanically connected with the engine control, for example, an accelerator pedal in a car or accelerator handle on a motorcycle can be used as such. The proposed engine can be provided with any known processor 42, from among widely used at present in automobiles (cars). An electromechanical drive, consisting of an electric motor with a reduction gear and a retractable rod 43, or an electromagnetic drive, consisting of a solenoid with the moving core, on which the rod 43 is fixed can be used as the drive 41 for pressure on the cutoff valve 21 for compression of the spring 20. Such drives are widely known in different fields of engineering. The known pneumatic equipment, for example, a compressor or receiver with the compressed air, can be used in a pneumatic embodiment of the drive 41 design, as well as known pneumatic commissioning and adjusting (balancing and commissioning) equipment.

Thus, the proposed engine and method for operating thereof provides technical effect, consisting in the fact that operating stability is increased, engine power is increased and fuel consumption is decreased, as well as in toxicity reduction of the exhaust gases by homogenization of the fuel-air mixture. The engine can be produced with the help of known in engineering means and materials. Hence, the proposed engine possesses industrial application.

What is claimed is:

1. A method for operating an internal combustion engine comprising a working cylinder provided with a piston kinematically connected with a crankshaft, a head of the working cylinder, provided with a combustion chamber disposed in the head of the working cylinder, and with a preignition chamber comprising a spark plug;

the method comprising:

controlling the power of the engine by adjusting an amount of fuel in the fuel-air mixture injected into the preignition chamber and into the combustion chamber, the combustion chamber and the preignition chamber having a first set of return valves that connect the combustion chamber and the preignition chamber with a supercharger of a fuel-air mixture via fuel-air mixture supplying channels, the supercharger comprising a compressor cylinder with a compressor piston kinematically connected with a working piston, a fuel delivery channel with a device for fuel delivery disposed in the fuel delivery channel, and an air delivery channel, as well as with a cutoff valve with a seat;

adjusting the amount of fuel by changing a pulse duration of a fuel delivery through a fuel proportioning device; and changing the pulse duration by controlling a velocity of injection of the fuel-air mixture into the preignition chamber and into the combustion chamber of the working cylinder during a change of an operating mode of the engine to increase or decrease pressure in the compressor cylinder, by changing pressure exerted by the cutoff valve pressure onto the seat.

2. The method defined in claim 1, wherein when the pulse duration is increased, the pressure in the compressor cylinder is increased, and when the pulse duration is decreased, the pressure in the compressor cylinder is decreased so that a ratio of air and fuel in the fuel-air mixture around a location of electrodes of the spark plug in the preignition chamber varies between 8:1 and 20:1.

3. The method defined in claim 2, further comprising injecting the fuel-air mixture into the preignition chamber and the combustion chamber of the working cylinder when the piston is moving toward an upper dead point of the compressor piston after closing an inlet channel and an outlet channel of the working cylinder, but no later than 5° before the electrodes of the spark plug discharge.

4. The method defined in claim 1, further comprising injecting the fuel-air mixture into the preignition chamber and the combustion chamber of the working cylinder when the piston is moving toward an upper dead point of the compressor piston after closing an inlet channel and an outlet channel of the working cylinder, but no later than 5° before electrodes of the spark plug discharge.

5. An internal combustion engine, comprising:
   a working cylinder provided with a piston kinematically connected with a crankshaft;
   a head of the working cylinder, provided with a combustion chamber disposed in the head of the working cylinder, and with a preignition chamber comprising a spark plug;
   the combustion chamber and the preignition chamber having a first set of return valves that connect the combustion chamber and the preignition chamber with a supercharger of a fuel-air mixture via fuel-air mixture supplying channels;
   the supercharger comprising a compressor cylinder with a compressor piston kinematically connected with a working piston, a fuel delivery channel with a device for fuel delivery disposed in the fuel delivery channel, and an air delivery channel, as well as with a cutoff valve with a seat;
   wherein the fuel delivery channel and the air delivery channel are disposed in the upper portion of the compressor cylinder and above an upper dead point of the compressor piston, and wherein a second set of return valves is disposed at the outlet of the air delivery channel into the compressor cylinder.

6. The internal combustion engine according to claim 1, further comprising:
   a lid covering the working cylinder and the compressor cylinder and filled with a cooling liquid;
   the fuel-air mixture supplying channels disposed in the lid and made as a tube divided along its longitudinal axis by a partition, or as two parallel tubes;
   a power supply unit for a heater disposed around the fuel-air mixture supplying channels; and
   a temperature sensor of the cooling liquid connected with the power supply unit.

7. The internal combustion engine according to claim 6, wherein at least one fuel-air mixture supplying channel is provided with an adjustment mechanism having a drive connected to the device for fuel delivery or with a rotation speed transducer of an engine crankshaft.

8. The internal combustion engine according to claim 6, further comprising
   a processor connected with a fuel proportioning device and with a drive for exerting pressure on the cutoff valve; and
   an operation mode transducer connected with the processor.

9. The internal combustion engine according to claim 5, wherein the combustion chamber has a cylindrical shape, wherein the fuel-air mixture supplying channels have portions disposed in the combustion chamber and in the preignition chamber, and wherein projections of axes of the portions on the plane of the longitudinal section of the working cylinder are perpendicular to the axis of the working cylinder.

10. The internal combustion engine according to claim 9, wherein at least one fuel-air mixture supplying channel is provided with an adjustment mechanism having a drive connected to the device for fuel delivery or with a rotation speed transducer of an engine crankshaft.

11. The internal combustion engine according to claim 9, further comprising
   a processor connected with a fuel proportioning device and with a drive for exerting pressure on the cutoff valve; and
   an operation mode transducer connected with the processor.

12. The internal combustion engine according to claim 5, wherein at least one fuel-air mixture supplying channel is provided with an adjustment mechanism having a drive connected to the device for fuel delivery or with a rotation speed transducer of an engine crankshaft.

13. The internal combustion engine according to claim 12, further comprising
   a processor connected with a fuel proportioning device and with a drive for exerting pressure on the cutoff valve; and
   an operation mode transducer connected with the processor.

14. The internal combustion engine according to claim 5, further comprising
   a processor connected with a fuel proportioning device and with a drive for exerting pressure on the cutoff valve; and
   an operation mode transducer connected with the processor.

* * * * *